March 28, 1967 J. J. McWILLIAMS 3,311,132
LIQUID CONVEYING PIPES
Filed Oct. 31, 1963
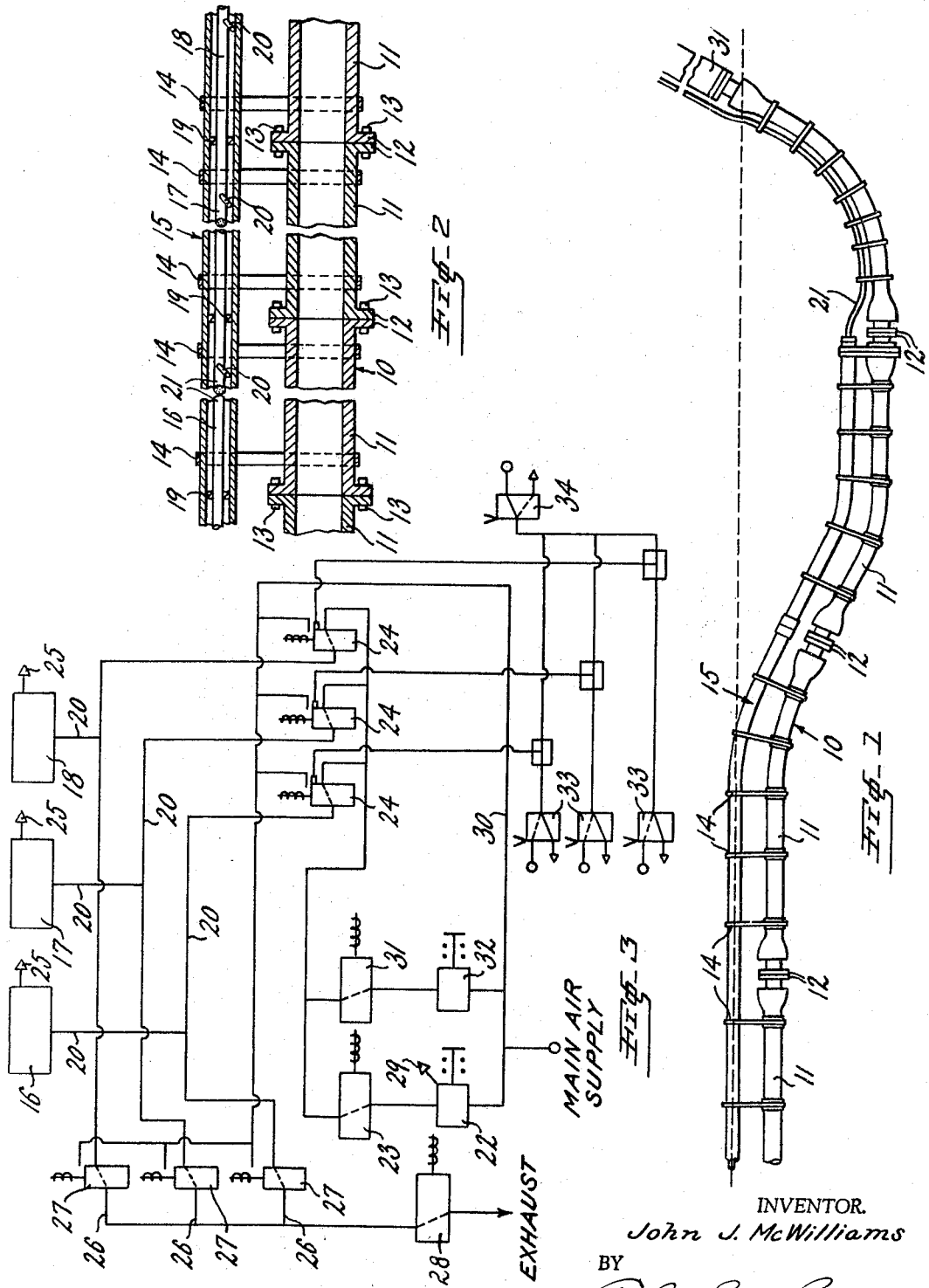
INVENTOR.
John J. McWilliams
BY
Arthur L. Whinston
ATTORNEY

3,311,132
LIQUID CONVEYING PIPES
John J. McWilliams, Leamington Spa, England, assignor to The North British Rubber Company Limited, Edingburgh, Scotland, a corporation of Scotland
Filed Oct. 31, 1963, Ser. No. 320,387
2 Claims. (Cl. 138—111)

The present invention relates to liquid conveying pipes and more particularly to such pipes which are capable of floating on the sea and being used for unloading or loading oil or other liquids from a tanker to a shore installation or vice versa.

It is usual practice in these circumstances to lay a pipeline on the sea bed from the shore to a supply point which is a sufficient distance from the shore to enable tankers to approach closely thereto. A floating pipe is then connected between the supply point and the tanker to effect loading or unloading operations.

The object of the present invention is to provide a liquid conveying pipe as referred to above which is capable of being submerged when the loading operations are completed and which can be floated again even though the means providing buoyancy have sustained damage.

A further object of the invention is to greatly reduce the danger of damage to the air pressure hoses by accommodating them within the air pipe providing the buoyancy.

The present invention consists in an air pipe adapted to be associated with a liquid conveying pipe for the purpose of floating or submerging the latter as desired, said air pipe having independent compartments or sections with valve means controlling the flow of air to and from each compartment to effect the raising and lowering of the liquid conveying pipe, as required.

The liquid conveying pipe may be attached to the air pipe by belts, chains, wire ropes, or other suitable means, or alternatively, the air pipe may be concentrically arranged around the outer surface of the liquid conveying pipe.

In the accompanying drawings:

FIGURE 1 is an elevational view of a floating hose associated with an air pipe according to the present invention, FIGURE 2 is a diagrammatic view of a portion of the assembly shown in FIGURE 1, and FIGURE 3 is a diagram showing the valve layout controlling the flow of air to and from the air pipe.

In carrying the invention into effect according to one convenient mode, as shown by way of example in FIGURES 1 and 2, an oil conveying pipe 10 is formed from a plurality of flexible pipe lengths 11 each having a rigid flange 12 on the ends thereof which are connected to the flanges 12 of adjacent pipe lengths by means of bolts 13. In FIGURE 1 the pipe lengths 11 are shown connected to a pipe 31 rigidly mounted on a floating supply buoy (not shown). The oil conveying pipe 10 so formed is attached by means of belts 14, or chains, wire ropes, or other suitable connecting means to an air pipe 15, which is capable of being floated or submerged as desired. Preferably, the belts 14 are formed of nylon fabric reinforced with a rubber covering.

The interior of the air pipe 15 is provided with independent compartments or sections 16, 17, 18 (FIGURE 2) formed by spaced bulkheads or partitions 19 positioned along the length thereof and each section is provided with independent air pressure and discharge lines 20 positioned within the pipe 15. The air lines 20 are accommodated in a hose 21 having a plurality of ducts corresponding to the number of pipe sections and each section has associated valves as described below controlling the flow of air to and from the section. The hose 15 is provided with two master stop valves 23 and 31 associated, respectively, with a low pressure regulating valve 22 and a high pressure regulating valve 32. The valves control the flow of air through all the air lines 20 and each air line 20 is provided with an electrically activated, pressure operated on/off valve 24 having an associated manual override valve 33. The air passes to each of the sections 16, 17, 18 through the associated valve 24. Each section 16, 17, 18 is also provided with a discharge line 26 under the control of an on/off valve 27 and the plurality of discharge lines are all controlled by a master stop valve 28.

The low pressure regulating valve 22 is provided with a pressure relief valve 29 and there is also provided a pilot operating air line 30 which is connected directly to the main air supply and maintains air pressure for operation of the pilot solenoid valves on each of the valves 24 and 27.

In operation, assuming the air pipe 15, and oil conveying pipe 10 are both laying on the sea bed with all valves closed, in order to raise the pipes 10 and 15 to the surface, the high pressure regulator 32 is set to a predetermined level (e.g., between 40 and 50 pounds per square inch) and air flows to the master stop valve 31. Stop valve 31 is actuated and the air under pressure is passed simultaneously to each on/off valve 24. The valves 24 are actuated simultaneously or sequentially, with the result that air flows to compartments 16, 17, 18 pressurizing the air pipe 15 to the level predetermined by the pressure regulator 32 and, carrying with it the oil conveying pipe 10, rises to the surface. Having reached the surface, the master stop valve 31 is closed and the low pressure regulator 22 is opened. The master stop valve 23 is actuated and air flows out through the pressure regulator 29, thus reducing the air pressure to a level required to maintain the pipes 10 and 15 in the floating condition (e.g., between 10 and 15 pounds per square inch).

When the oil loading or unloading operation has been completed and it is desired to submerge the pipes 10 and 15, the pressure valves 22, 23 and 24 are all closed and the master stop valve 28 on the vacuum side is opened. The discharge on/off valves 27 in the discharge lines 26 are then actuated sequentially and the pipes 10 and 15 sink to the sea bed.

It will be appreciated that the valves 24 may be operated electrically, or by the manual override valves 33. Each manual override valve 33 can operate its associated on/off valve 24 individually, or all the valves 24 may be under the control of a master manual override valve 34.

In an alternative construction the flanges 12 of adjacent lengths of liquid conveying pipe 11 have a disc of epoxy resin therebetween of greater diameter than the flanges, with an aperture in the disc corresponding to the bore of the pipe. The periphery of the disc is provided with a rim of epoxy resin rigidly attached thereto which is coaxially arranged with respect to the pipe. A rubber or plastic coated fabric extends around and between the rims to form a plurality of independent compartments or sections around the outer surface of the pipe, each of which is provided with air pressure and discharge lines and valve means as described above.

Having thus described my invention, what I claim and desire to protect by Letters Patent is:

1. An air pipe adapted to be associated with a liquid conveying pipe for the purpose of floating or submerging the latter as desired, comprising: a plurality of independent compartments along the length of said pipe; a hose positioned within said pipe and extending the length of said pipe through each of said compartment; inlet and discharge air lines in each of said compartments connecting said hose with the interior of said compartments; and valve means for controlling the flow of air to and from said compartments through said air lines.

2. The air pipe of claim 1 wherein said valve means comprises on/off valves positioned in said air lines and stop valve means for controlling the supply of air to all of said inlet valves and discharge valves.

References Cited by the Examiner
UNITED STATES PATENTS

| 2,445,628 | 7/1948 | Muller | 138—103 |
| 2,871,665 | 2/1959 | Brandt | 61—72.3 |
| 3,204,658 | 9/1965 | Suzuki | 137—236 |

FOREIGN PATENTS

| 80,801 | 5/1963 | France. |
| 1,272,576 | 8/1961 | France. |

LAVERNE D. GEIGER, *Primary Examiner.*

C. L. HOUCK, *Assistant Examiner.*